(12) United States Patent
Cavanaugh et al.

(10) Patent No.: US 6,897,917 B2
(45) Date of Patent: May 24, 2005

(54) LIQUID CRYSTAL VARIABLE OPTICAL ATTENUATOR

(75) Inventors: Shanti A. Cavanaugh, Santa Rosa, CA (US); Lindsay W. Austin, Santa Rosa, CA (US); Mark E. Young, Santa Rosa, CA (US); Louis J. Molinari, Windsor, CA (US)

(73) Assignee: Spectraswitch, Inc., Santa Rosa, CA (US)

( * ) Notice: Subject to any disclaimer, the term of this patent is extended or adjusted under 35 U.S.C. 154(b) by 229 days.

(21) Appl. No.: 10/379,384

(22) Filed: Mar. 3, 2003

(65) Prior Publication Data

US 2004/0174473 A1 Sep. 9, 2004

Related U.S. Application Data

(63) Continuation of application No. 10/371,235, filed on Feb. 21, 2003.

(51) Int. Cl.⁷ .................................. G02F 1/1335
(52) U.S. Cl. ........................... 349/96; 349/196
(58) Field of Search .................. 349/96, 196, 197, 349/198; 359/486, 487

(56) References Cited

U.S. PATENT DOCUMENTS

| | | |
|---|---|---|
| 4,135,789 A | 1/1979 | Hall |
| 4,148,128 A | 4/1979 | Feldman |
| 4,165,157 A | 8/1979 | Kobale |
| 4,310,220 A | 1/1982 | Kuwagaki |
| 4,315,668 A | 2/1982 | Aftergut |
| 4,410,238 A | 10/1983 | Hanson |
| 4,545,650 A | 10/1985 | Kirkman |
| 4,556,289 A | 12/1985 | Fergason |
| 4,634,225 A | 1/1987 | Haim |
| 5,013,140 A | 5/1991 | Healey |
| 5,015,057 A | 5/1991 | Rumbaugh |
| 5,088,806 A | 2/1992 | McCartney |
| 5,276,747 A | 1/1994 | Pan |
| 5,414,541 A | 5/1995 | Patel |
| 5,430,561 A * | 7/1995 | Kato et al. ........ 349/202 |
| 5,528,402 A | 6/1996 | Parker |
| 5,724,165 A | 3/1998 | Wu |
| 5,726,805 A | 3/1998 | Kauskik |
| 5,727,109 A | 3/1998 | Pan |
| 5,859,728 A | 1/1999 | Colin |
| 5,877,876 A | 3/1999 | Birdwell |
| 5,914,811 A * | 6/1999 | Chen et al. ........ 359/495 |
| 5,953,087 A | 9/1999 | Hoyt |
| 5,963,291 A | 10/1999 | Wu |
| 6,046,851 A * | 4/2000 | Katayama ........ 359/486 |
| 6,075,512 A | 6/2000 | Patel |
| 6,094,246 A | 7/2000 | Wong |
| 6,141,076 A | 10/2000 | Liu |
| 6,141,361 A | 10/2000 | Mears |
| 6,144,427 A * | 11/2000 | Hoshi et al. ........ 349/105 |
| 6,166,838 A | 12/2000 | Liu |
| 6,181,846 B1 | 1/2001 | Pan |
| 6,201,593 B1 | 3/2001 | Wong |

(Continued)

Primary Examiner—James A. Dudek

(57) ABSTRACT

A twisted nematic liquid crystal variable optical attenuator is presented with one substrate that includes a integrated subwavelength nanostructured polarizer. The device may incorporate an integrated isolator whereby a substrate of the liquid crystal sandwich is formed from doped garnet to comprise a faraday rotator etched with a subwavelenth optical nanostructured polarizing grating and enabling the substrate to function as an isolator. The liquid crystal variable optical attenuator may include a deposited metal gasket moisture barrier bonding the opposing top and bottom substrates each having a spacer layer to accurately control cell gap thickness. The liquid crystal variable optical attenuator may also include an integrated thermal sensor and heater deposition layer sandwiched between or deposited on at least one or both opposing substrates.

52 Claims, 14 Drawing Sheets

U.S. PATENT DOCUMENTS

| | | |
|---|---|---|
| 6,215,928 B1 | 4/2001 | Friesem |
| 6,253,015 B1 | 6/2001 | Ukrainczyk |
| 6,285,478 B1 | 9/2001 | Liu |
| 6,285,500 B1 | 9/2001 | Ranalli et al. |
| 6,323,974 B1 | 11/2001 | Harris et al. |
| 6,353,467 B1 | 3/2002 | Wong |
| 6,356,389 B1 | 3/2002 | Nilsen |
| 6,388,730 B1 | 5/2002 | Lindquist |
| 6,404,538 B1 | 6/2002 | Chen |
| 6,417,948 B1 | 7/2002 | Chowdhury et al. |
| 6,426,816 B1 | 7/2002 | Wu |
| 6,429,962 B1 | 8/2002 | Xu |
| 6,455,841 B2 | 9/2002 | Zhou |
| 6,498,680 B1 | 12/2002 | Zhou |
| 6,515,751 B1 | 2/2003 | Craighead et al. |
| 6,519,022 B1 | 2/2003 | Xu |
| 6,603,781 B1 | 8/2003 | Stinson |
| 6,621,580 B2 | 9/2003 | Myatt |
| 2003/0201966 A1 | 10/2003 | Pan |

* cited by examiner

LIQUID CRYSTAL VARIABLE OPTICAL ATTENUATOR

CROSS-REFERENCE TO RELATED APPLICATIONS

This application is a continuation of and claims priority from commonly assigned application Ser. No. 10/371,235, titled "Liquid Crystal Cell Platform", filed Feb. 21, 2003. This application is also related to the following copending U.S. nonprovisional applications, all of which are herein incorporated by reference; "Fabrication Method for Liquid Crystal Cell", filed Feb. 21, 2003 and having Ser. No. 10/371,976, and "Thermal Control System for Liquid Crystal Cell", filed Feb. 21, 2003 and having Ser. No. 10/371,983.

FIELD OF INVENTION

This invention relates generally to optical liquid crystal systems. More particularly, it relates to liquid crystal variable optical attenuators formed by substrates etched with sub wavelength, nanostructured gratings.

BACKGROUND OF THE INVENTION

Since the advent of fiber optics, the fiber optical communication infrastructures have become more diverse and sophisticated. The fiber optic applications range from low speed, local area networks to high speed, long distance telecommunication systems. In recent years, the demands for greater bandwidth and lower network costs have resulted in increased component integration and optical devices that offer multiple functions in a single package. For example, optical cross connect switches designed with built-in variable optical attenuators provide power equalization across channels. Photonic integrated circuits route, condition and monitor DWDM wavelengths all within a single package. Popularity of such integrated devices are largely based on the cost savings and performance advantages they offer over individually packaged components. Such integrated devices also simplify coupling and alignment challenges in the optical system and offer lower insertion loss over their individually packaged counterparts.

Optical isolators are used in present day optical fiber networks to block reflected signals from reaching a source laser or LED, and optical isolators are expected to be placed in front or behind a variable optical attenuator in next generation transceiver modules. Optical isolators are typically comprised of a sandwich $1^{st}$ polarizer, faraday rotator, $2^{nd}$ polarizer, wherein polarized laser light output parallel to the optical axis of the $1^{st}$ polarizer passes through the $1^{st}$ polarizer and is rotated 45 degrees by the faraday rotator prior to passing through the $2^{nd}$ polarizer which has an optical axis offset 45 degrees from the $1^{st}$ polarizer to allow the light to pass. In an optical isolator, reflected light passing back through the $2^{nd}$ polarizer is further rotated by the faraday rotator by another 45 degrees and is absorbed by the $1^{st}$ polarizer.

As stated previously, a transceiver module often includes a variable optical attenuator connected to the output of the optical isolator to control the laser output signal strength. Variable optical attenuators (VOAS) may be of mechanical or non-mechanical type. Prior art mechanical VOAs include those based on a movable lens which defocuses output light, beam steering mirrors to off steer the center of the light spots away from an output collimators, cantilever arms to assert bends in fiber and shutters to impede the optical transmission path. These methods adjust coupling between two fibers thereby controlling attenuation across an optical path but are known to suffer from reliability issues such as mechanical wear and breakdown. To overcome these issues, non-mechanical VOAS have been introduced during the last several years, including VOAS based on liquid crystal technology.

Liquid crystal is a promising non-mechanical VOA technology with no moving parts. Liquid crystal optical attenuators are generally of a twisted nematic type (TN) comprised of two orthogonal polerizers affixed to the outside sandwich of transparently conductive glass plates each anchored with orthogonal alignment layers. Liquid crystal molecules sealed between the plates of glass homeotropically align with the orthogonal anchor layer and enjoin at the center of the liquid crystal sandwich along a helical twist. Voltage applied across the liquid crystal plates causes the liquid crystal molecules to untwist and realign, in so controllably rotating the polarization of light passing through the cell, creating for variable attenuation of the light source at the output polarizer. However, it is generally known that liquid crystal cells are susceptible to temperature and humidity change, and that high humidity and temperature changes cause decreased optical performance, resulting in high insertion loss and low extinction, two critical measures of a liquid crystal cell's performance.

Recent advances in nano imprint lithography has resulted in the ability cost effectively etch a substrate with sub wavelength optical grating nanostructures, and these nanostructures are known to exhibit unique optical properties as a result of having feature sizes in the hundreds of nanometers to tens of nanometers, below the wavelength of incident light. For example, a glass substrate was recently etched to form a subwavelength optical nanostructure grating on its surface, enabling the glass to perform as polarization filter. In addition, a Faraday rotator substrate has been etched with a similar subwavelength optical nanostructure grating to result in the formation of an integrated isolator.

Given the cost and performance benefits of integration, the assertion that liquid crystal technology is highly compatible with imprint lithography, the potential to generate liquid crystal substrates capable of providing polarization and isolation optical functions, a strong need exists for liquid crystal variable optical attenuator integrated with a discreet polarizer and isolator that also overcomes the aformentioned issues associated with liquid crystal technology.

FEATURES OF THE INVENTION

The present invention contains several features that may be configured independently or in combination with other features of the present invention, depending on the application and operating configurations. The delineation of such features is not meant to limit the scope of the invention but merely to outline certain specific features as they relate to the present invention.

It is a feature of the present invention to provide a liquid crystal variable optical attenuator that may be formed of glass etched with sub wavelength optical features.

It is a feature of the present invention to provide a liquid crystal variable optical attenuator that may be configured with an integrated isolator.

It is a feature of the present invention to provide a liquid crystal variable optical attenuator that may be configured with an integrated isolator that includes a first substrate etched with sub wavelength optical nanostructures enabling the substrate to perform as a polarizer, and second substrate including an etched faraday rotator that provides isolation function.

It is a feature of the present invention to provide a liquid crystal variable optical attenuator that can be configured in various applications, including but not limited to telecommunications applications in transceivers, dynamic gain equalizers, reconfigurable optical add/drop multiplexers, variable optical attenuator arrays, tunable lasers, tunable optical add/drop multiplexer with and without optical power monitoring functionality.

It is a feature of the present invention to provide a liquid crystal variable optical attenuator that may be constructed from materials substantially impervious to moisture.

It is a feature of the present invention to provide a liquid crystal variable optical attenuator that may be constructed from materials substantially impervious to moisture and include an integrated isolator.

It is a feature of the present invention to provide a liquid crystal variable optical attenuator that may contain a heater and temperature sensor integrated therein as single physical element and to provide for accurate control of heating and temperature sensing.

It is a feature of the present invention to provide a liquid crystal variable optical attenuator that may include an isolator, heater and temperature sensor integrated therein.

It is a feature of the present invention to provide a novel method of operating a liquid crystal variable optical attenuator across a range of temperature without the need for lookup tables otherwise used to compensate for real time temperature changes.

It is a feature of the present invention to provide a liquid crystal variable optical attenuator that passes the strict telecommunications guidelines as outlined in Telcordia GR1221 without the need for hermetic housing.

It is a feature of the present invention to provide an optically flat liquid crystal variable optical attenuator cell not prone to warpage during fabrication process.

It is a feature of the present invention to provide an optically flat liquid crystal variable optical attenuator not prone to warpage when exposed to various thermal and humidity atmospheres.

It is a feature of the present invention to provide a liquid crystal variable optical attenuator whose thickness may be controlled at nanometer resolution.

It is a feature of the present invention to provide a liquid crystal variable optical attenuator whose thickness may be controlled at nanometer resolution and which may further include an integrated isolator.

It is a feature of the present invention to provide a novel method for fabricating a liquid crystal variable optical cell having some or all of the features included therein.

It is a feature of the present invention to provide a liquid crystal variable optical attenuator that may be configured into an NXM array of liquid crystal variable optical attenuators.

It is a feature of the present invention to provide a liquid crystal variable optical attenuator that may be configured into an NXM array of liquid crystal variable optical attenuators and that each may include an isolator

SUMMARY OF THE INVENTION

The disadvantages associated with the prior art may be overcome by a twisted nematic liquid crystal variable optical attenuator having at least one substrate that includes a integrated subwavelength nanostructured polarizer. In one configuration, the device may be formed from doped garnet substrate to comprise a Faraday rotator etched with a subwavelenth optical nanostructured polarizing grating, enabling the substrate to function as an isolator. The liquid crystal variable optical attenuator may include a deposited metal gasket moisture barrier bonding the opposing top and bottom substrates each having a spacer layer to accurately control cell gap thickness. The liquid crystal variable optical attenuator may also include an integrated thermal sensor and heater deposition layer sandwiched between or deposited on at least one or both opposing substrates.

The disadvantages associated with the prior art may further be overcome with a liquid crystal variable optical attenuator control system utilizing a time division scheme that multiplexes temperature sensing and heating functions across an integrated active thermal element such that the cell may generally be kept at a constant temperature. A calibration process is included to characterize the profile of the cell and generate a polynomial regression formula that provides the voltage drive output for a temperature and cell state input. The control system stores the state of the liquid crystal cell, the regression formula, and reads the temperature of the liquid crystal cell to compute and assert the temperature compensated voltage drive.

DETAILED DESCRIPTION

Throughout this application, like reference numbers as used to refer to like elements. Integrated polarizers may be referenced by the same index across the multipe embodiments but the polarizers may be tuned with a different optical axis as described and supported in the specification. Furthermore, those supporting elements and features of the invention that are distributed on each substrate and later combined may be referred to under their index reference for a particular substrate 'A, 'B or for simplicity sake, under the shared reference '.

Figure 1A:
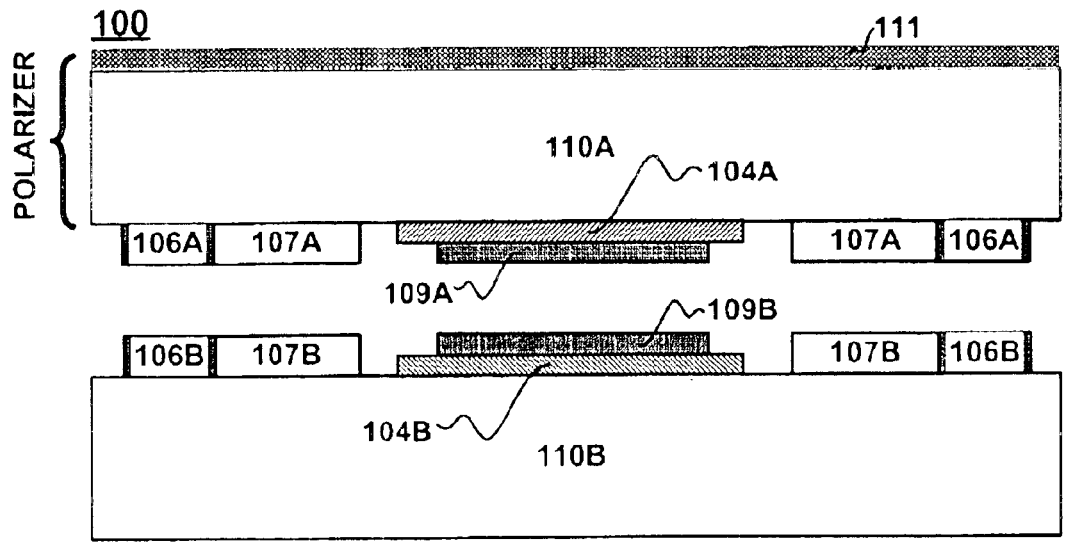
FIGS. 1a and 1b show an example first embodiment liquid crystal attenuator having an integrated polarizer substrate.
Figure 1B:
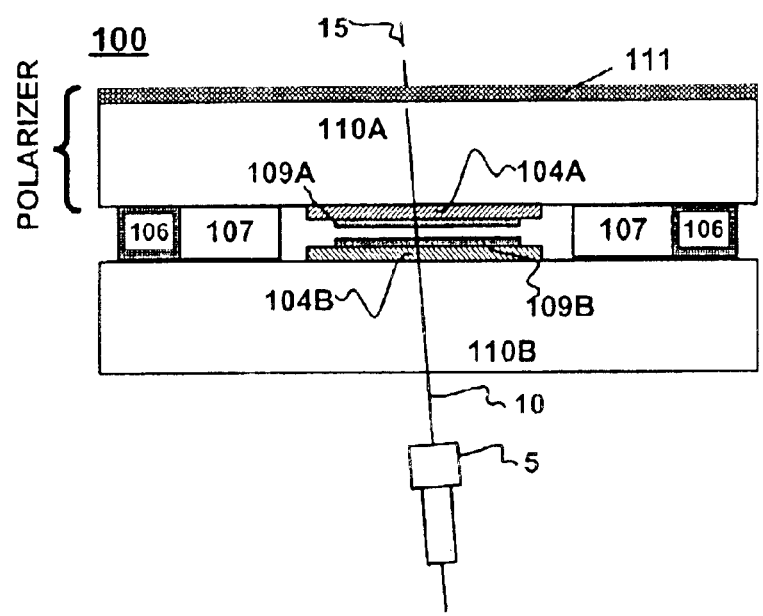

A first embodiment of the present invention is presented in FIG. 1a, which shows a liquid crystal variable optical attenuator platform 100 having a first glass substrate 110A in opposition to a second glass substrate 110B wherein the first substrate includes a polarizing feature 111 on one side of the substrate, a transparent conductive electrode layer 104A, a first liquid crystal alignment layer 109A, metal gasket layer 106A and spacer layer 107A on the opposing side, and, the second substrate 110B containing a transparent conductive electrode layer 104B, a second liquid crystal alignment layer 109B anchored with a rub angle orthogonal to the first liquid crystal alignment layer 109A, metal gasket layer 106B and a spacer layer 107B. FIG. 1b shows the free space variable optical attenuator 100 and a light source 5 generating polarized light 10 input to the device and controllably rotated as it passes through twisted nematic liquid crystal configuration. As such, with no voltage applied to the electrode layers, the device causes substantially a 90 degree rotation of the polarized light 10, enabling substantially all of the light to pass through the polarizing feature 111 which has an optical axis orthogonal to the light 10. Marginal voltage applied to the electrodes causes the liquid crystal molecules to untwist or tend to align along the electrical field, which results in a partial rotation of the input light 10 and a partial retardance of light 10 through the polarizing feature 111. A reference voltage applied to the electrodes 104A and 104B can result in near full alignment of the molecules along the electrical field and cause substantially no rotation of light 10 passing through the device. This may define the maximum attenuation or extinction state of the liquid crystal variable optical attenuator.

Figure 2A:
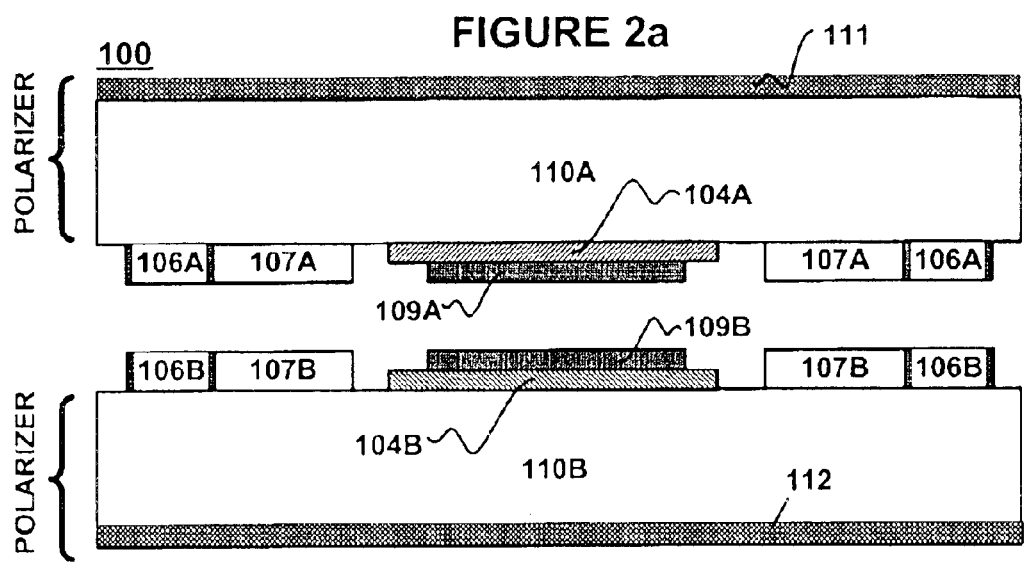
FIGS. 2a and 2b show an example second embodiment liquid crystal attenuator having an integrated first polarizer substrate having an optical axis orthogonal to the optical axis of an integrated second polarizer substrate.
Figure 2B:
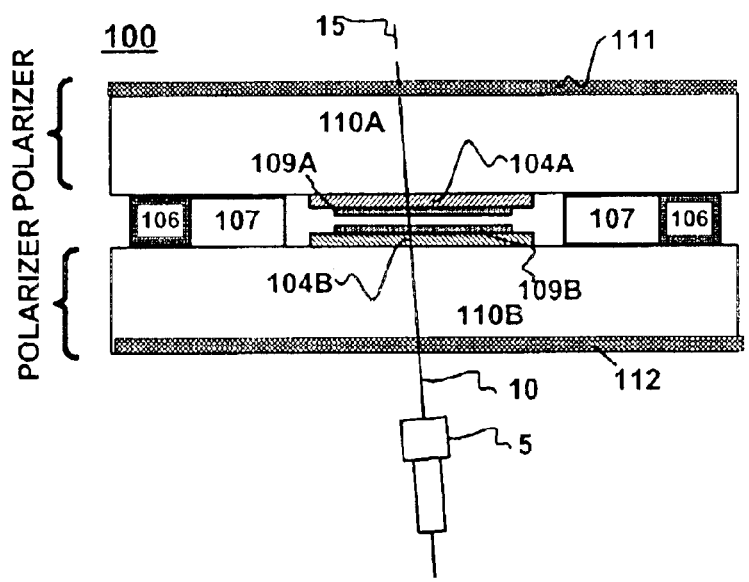

A second embodiment of the present invention includes all those features of the first embodiment but further includes polarizing feature 112 on the outer side of substrate 110B, as shown in FIG. 2. The polarizing feature 112 may provide a reference polarization plane for incoming light, be configured with the same polarization of the light 10 but have an optical axis orthogonal to the polarization of the polarizing feature 111 on substrate 110A.

Figure 3A:
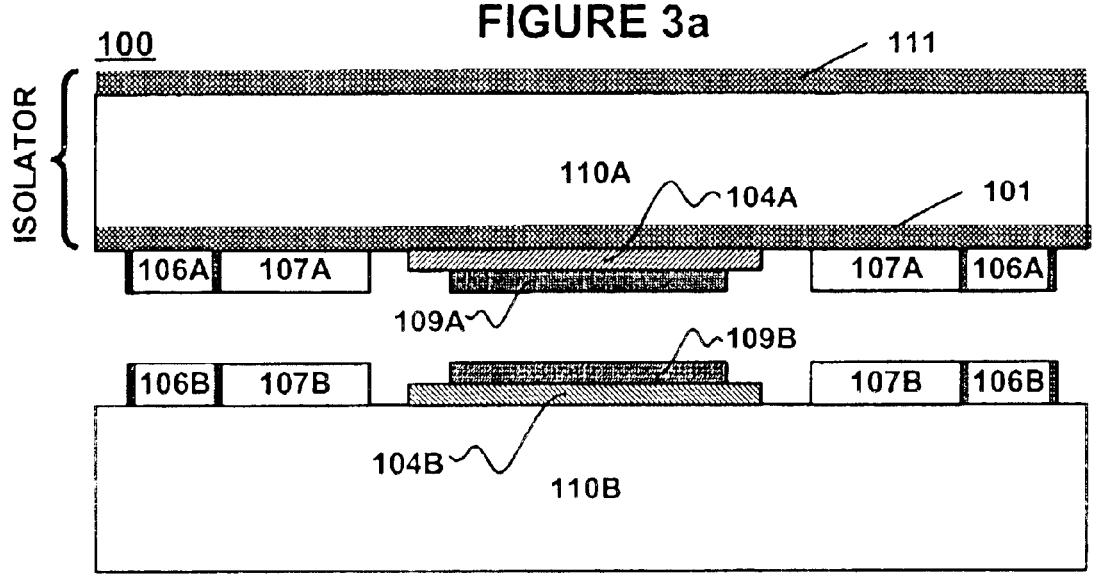
FIGS. 3a and 3b show the third embodiment liquid crystal attenuator having an integrated isolator substrate.
Figure 3B:
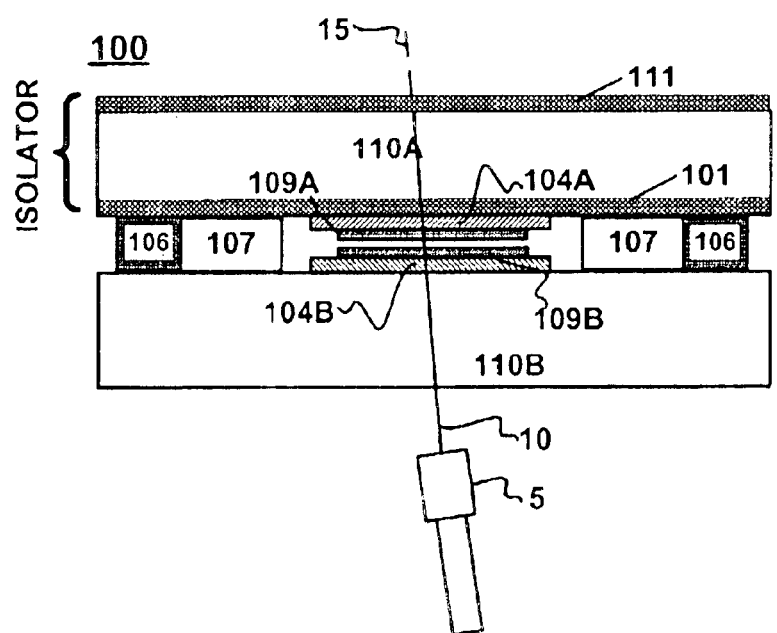

A third embodiment of the present invention includes an integrated isolator. The choice of substrate material for this embodiment must enable substrate 110A to function as a Faraday rotator. Such materials may include those based on Bi-substituted rare-earth iron garnet thick-film single crystal technology. Substrate 110B may be glass. In this embodiment, both the upper and lower surfaces of the Faraday substrate 110A will be etched with subwavelength optical polarizing elements 111 and 101, respectively. The period and size of the grating polarizing elements are selected such that their optical axes are spaced 45 degrees apart as in a typical isolator, as those skilled in the art of are capable of designing. It is preferable that the grating polarizing element 101 located adjacent to the liquid crystal alignment layer 104A have an optical axis orthogonal to the polarization of light 10. FIG. 3b shows the free space variable optical attenuator 100 with integrated isolator. Light source 5 generates polarized light 10 that is input to the device and controllably rotated as it passes through twisted nematic liquid crystal configuration. With no voltage applied to the electrode layers, the device causes substantially a 90 degree rotation of the polarized light 10, enabling substantially all of the light to enter and pass through the optical isolator formed by the sandwich $1^{st}$ polarizer 101, Faraday rotator substrate 110A, $2^{nd}$ polarizer 111. With no voltage applied, the output light 10 from the liquid crystal is substantially parallel to the optical axis of the $1^{st}$ polarizer 101 so it passes through the $1^{st}$ polarizer and is rotated 45 degrees by the Faraday rotator prior to passing through the $2^{nd}$ polarizer which has an optical axis offset 45 degrees from the $1^{st}$ polarizer to allow the light, which has been further rotated by the Faraday rotator, to pass. In this embodiment, any reflected light passing back through the $2^{nd}$ polarizer 111 is further rotated 45 degrees by the Faraday rotator substrate 110A and absorbed by the $1^{st}$ polarizer 101. Marginal voltage applied to the electrodes 104A and 104B causes the liquid crystal molecules to untwist or tend to align to the electrical field, which results in a partial rotation of the input light 10 and a partial retardance of light 10 through the $1^{st}$ polarizer 101A. A reference voltage applied to the electrodes 104A and 104B will result in near full alignment of the molecules along the electrical field and cause substantially no rotation of light 10 as it passes through. This state may define the maximum attenuation or extinction state of the liquid crystal variable optical attenuator.

Figure 4A:
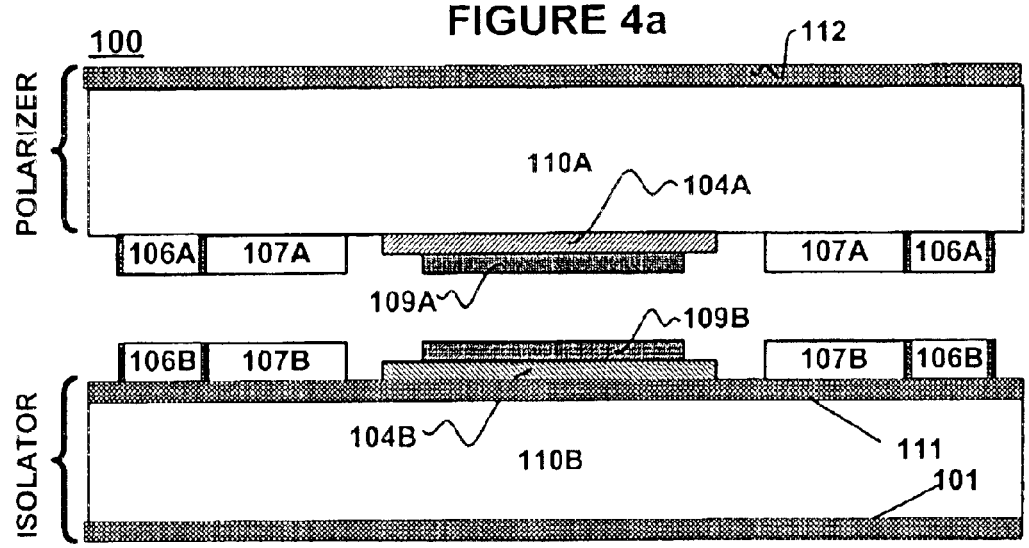
FIGS. 4a and 4b show the fourth embodiment liquid crystal attenuator having an integrated first isolator substrate and second polarizer substrate.
Figure 4B:
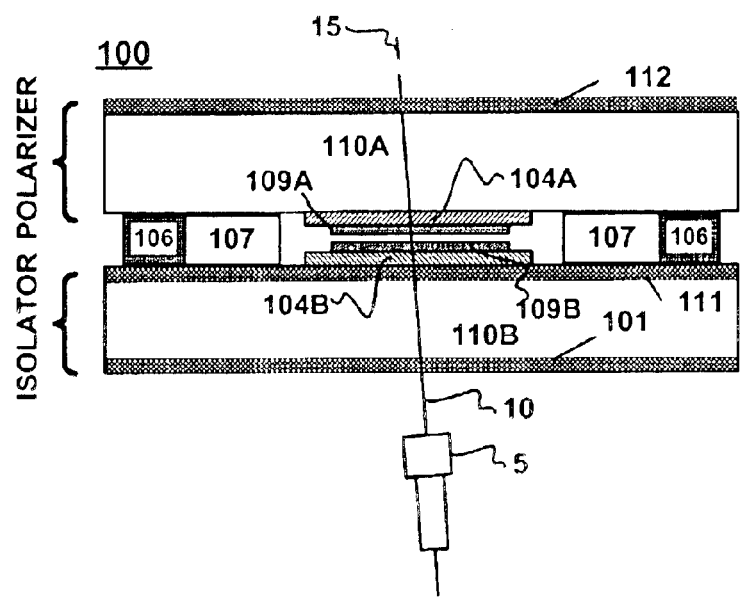

A fourth embodiment of the present invention also includes an isolator and is shown in FIG. 4a. In this embodiment, the isolator is positioned to receive the light at the input of the device. The choice of substrate material for this embodiment must enable substrate 110B to function as a Faraday rotator. Such materials may include those based on Bi-substituted rare-earth iron garnet thick-film single crystal technology. Substrate 110A may be glass. In this embodiment, both the upper and lower surfaces of the Faraday substrate 110B will be etched with subwavelength optical polarizing elements 111 and 101, respectively. The period and size of the grating polarizing elements are selected such that their optical axes are spaced 45 degrees apart as in a typical isolator, as those skilled in the art of are capable of designing. It is preferable that the grating polarizing element 101 have an optical axis equal to that of the polarized light 10. FIG. 4b shows the free space variable optical attenuator 100 with integrated isolator. Light source 5 generates polarized light 10 that is received by the first polarized nanostructure 101 and is rotated by a fixed 45 degrees via the Faraday rotator substrate 110B, enabling the light to continue to pass through the $2^{nd}$ polarized nanostructure 111 and into the twisted nematic liquid crystal configuration. With no voltage applied to the electrode layers 104A and 104B the liquid crystal device causes substantially a 90 degree rotation of the polarized light 10, enabling substantially all of the light to enter and pass through polarizer 112 which is polarized with an optical axis 135 degrees offset from the polarization of the source light 10. The optical axis of the polarizer 112 is chosen to be 135 degrees to accommodate both the initial 45 degrees rotation through the isolator as well as the 90 degree rotation through the liquid crystal. A marginal voltage applied to the electrodes 104A and 104B causes the liquid crystal molecules to untwist or tend to align along the electrical field, which results in a partial rotation of the input light 10 and a partial retardance of light 10 through the output polarized nanostructure 112. A reference voltage applied to the electrodes 104A and 104B will result in near full alignment of the molecules along the electrical field and cause substantially no rotation of light 10 as it passes through the liquid crystal. In this state, the output nanostructured polarizer 112 blocks the light from passing through. This state may be defined as the maximum attenuation or extinction state of the liquid crystal variable optical attenuator. In all states, any reflected light passing back through the $2^{nd}$ polarizer 111 is rotated by another 45 degrees via the Faraday rotator substrate 110A and finally absorbed by the $1^{st}$ polarizer 101.

Figure 4C:
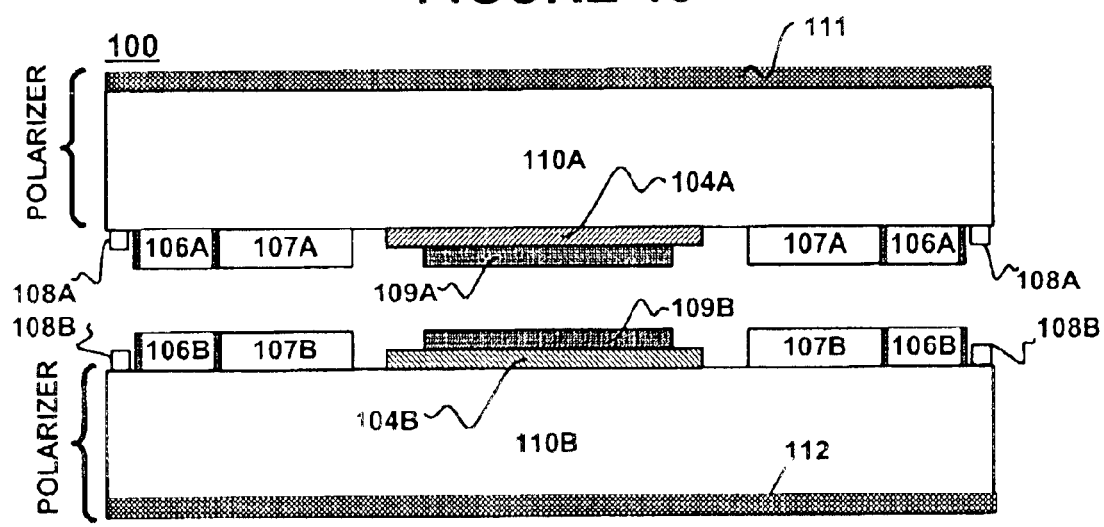
FIG. 4c shows an example configuration of the optional integrated heater/temperature sensor feature of the present invention.

FIG. 4c shows an example liquid crystal cell platform configured with an integrated heater/temperature sensor 108. The heater/temperature sensor 108 is an optional feature that can be configured across all embodiments of the present invention to apply thermal energy into the liquid crystal variable optical attunator as well as to read the temperature of the device. This feature will be described in the process steps that follow and in the control electronics section.

Figure 5:
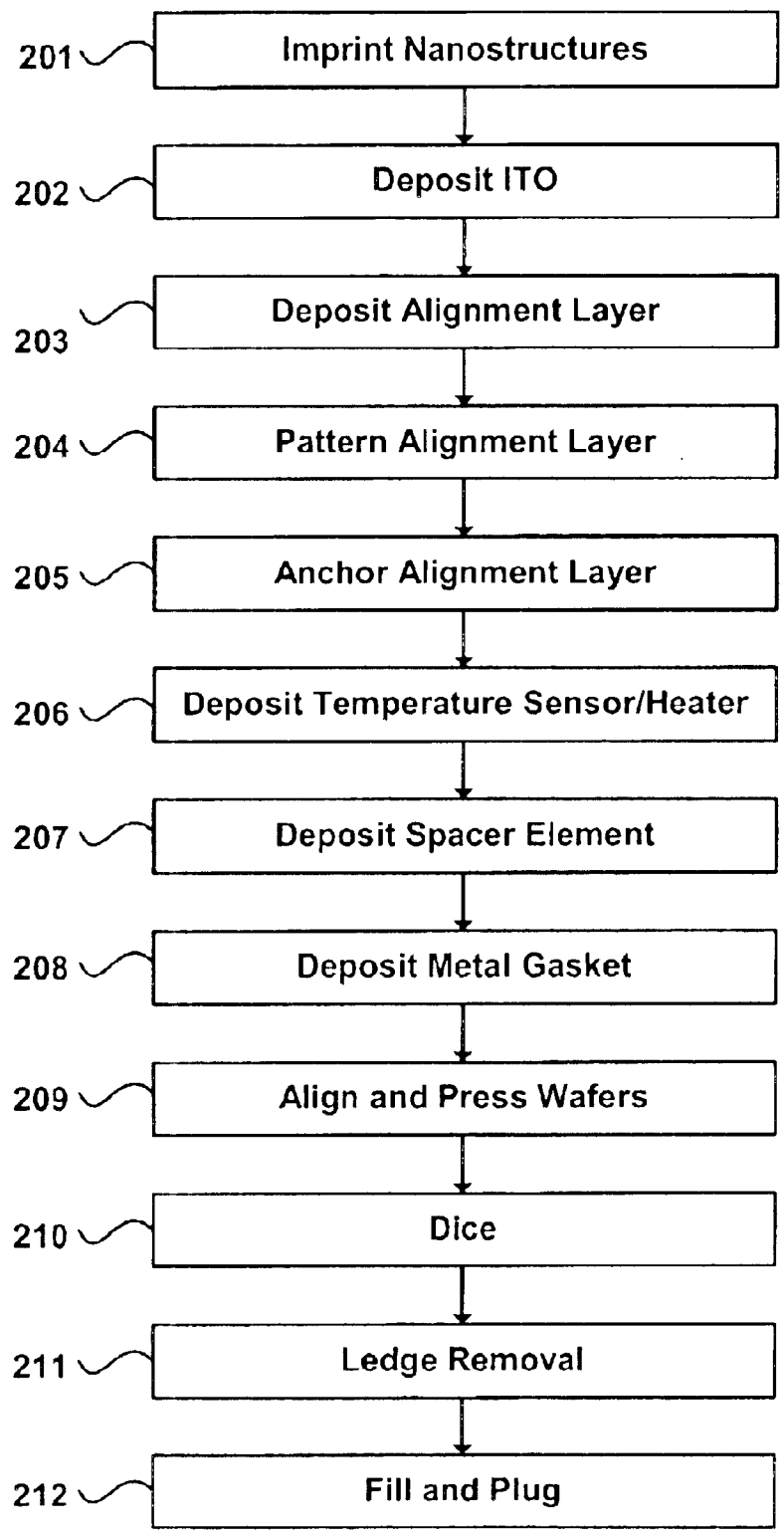
FIG. 5 shows one process flow for fabricating the liquid crystal attenuators of the present invention.

FIG. 5 shows one example fabrication process to create the liquid crystal cell platform 100. Various optional steps may be omitted depending on the embodiment of configured features.

With respect to FIG. 5, step one involves integrating the subwavelength nanostrucutred grating elements into the substrates. In the first embodiement, this step exclusively involves integrating the subwavelength polarizer grating 111 to glass substrate 110A. In the second embodiment, this step involves integrating the subwavelength polarizer grating 111 into glass substrate 110A and the subwavelength polarizer grating 112 into glass substrate 110B. In the third embodiement, this step involves integrating the third embodiement subwavelength polarizer grating 111 into the topside of Faraday rotator substrate 110A and the subwavelength polarizer grating 101 into the bottomside of Faraday rotator substrate 110A. In the fourth embodimment, this step involves integrating the fourth embodiment subwavelength polarizer grating 112 in substrate 110A, fourth embodiement subwavelength polarizer grating 111 into the topside of Faraday rotator substrate 110B and the fourth embodiement subwavelength polarizer grating 101 into the bottom side of Faraday rotator substrate 110B. Substrates integrated with the aformentioned features may be available from NanoOpto Corporation of New Jersey. However, the grating features may also be integrated into the substrates 110A and 110B by way of nanoimprint lithography or similar methods known in the field based on impressing a reference grating mask into photo resist to create surface relief patterns on the substrate where the surface relief photo resist pattern is etched to form grating features in the nanometer range. It is clear to those skilled in the art of modelling nanostructured gratings, that one can select the appropriate period and size of the gratings to establish the optical axis of each polarizer. Alternately, the polarizers may be integrated into the substrate by way of choice of substrate material. For example, the substrates may be polarized glass made by Corning, Inc.

Figure 6A:
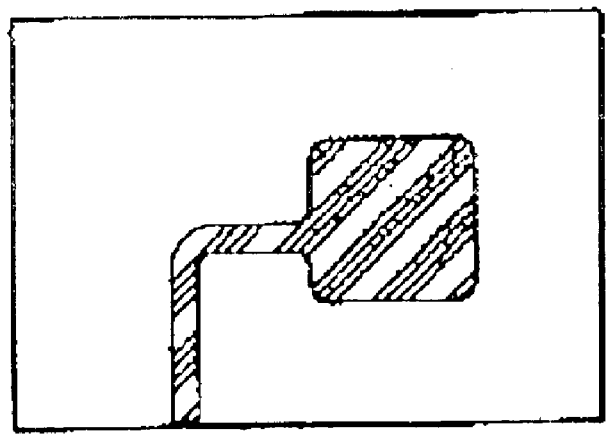
FIGS. 6A and 6B show example electrode forming masks of the present invention.
Figure 6B:
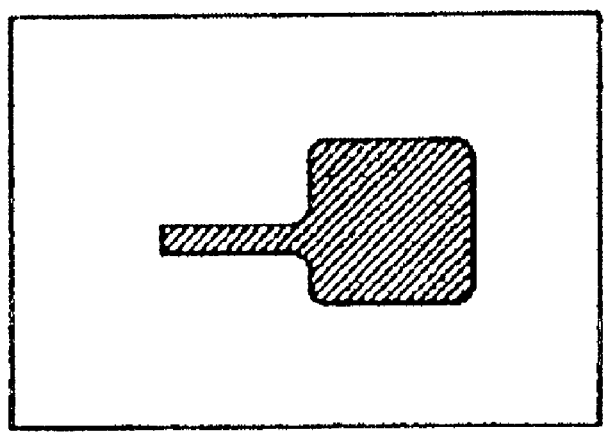

Step two involves adding the appropriate ITO patterns to the first and second glass substrates to form the liquid crystal electrodes. With respect to process flow 202 of FIG. 5, a standard PECVD process may be used to apply thin film of ITO approximately 100 angstroms thick. FIGS. 6A and 6B show example ITO masks that may be used to pattern substrates 110A and 110B, respectively.

Step three involves adding polyimide alignment layer to the first and second glass substrates. With respect to process flow 203 of FIG. 5, standard spin coating stepped processes may be used at room temperature to create a layer of polyimide approximately 600 angstroms thick on each substrate.

Step four involves patterning the polyimide layer. With respect to process 204, photo resist may first be applied to the substrates and masked using traditional photolithography techniques or laser etching may be used to pattern the substrates. Wet or dry etching performed thereafter may result in a pattern of polyimide.

Step five involves anchoring the liquid crystal alignment layers. With respect to process step 205, one traditional method is to rub the polyimide of each substrate to form the alignment layers. In a twisted nematic configuration, the rubbing direction of the first substrate may be orthogonal to the rubbing direction of the second substrate. In an electronically conductive birefringence (ECB) configuration, the rubbing direction of the first substrate may be parallel to the rubbing direction of the second substrate. Various anchoring schemes may be define rub angles other than 0 or 90 degrees. An alternate method of forming the alignment layers is to employ an imprint lithography technique where a reference mask is pressed onto a deposited photo resist layer to create surface relief patterns in the photo resist which is subsequently etched to form high precision alignment grooves with nanoscale tolerance.

Figure 7A:
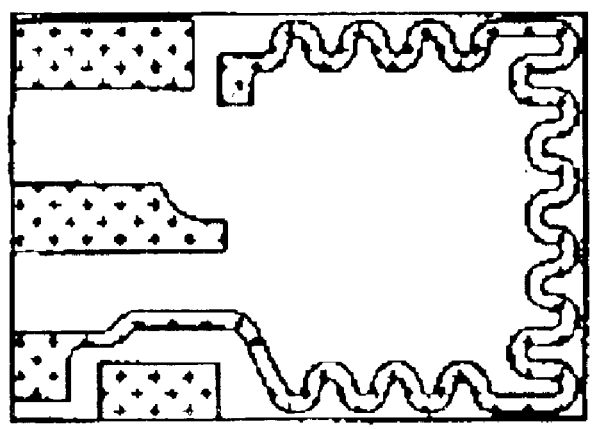
FIGS. 7A and 7B show example integrated active thermal element forming masks of the present invention.
Figure 7B:
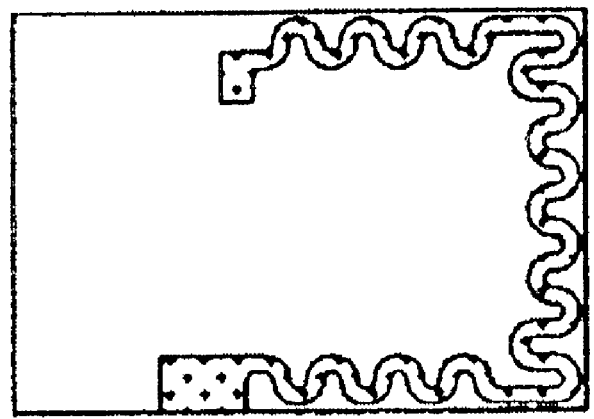

Optional step six involves creating the active thermal element, integrated heater and temperature sensor. FIGS. 7A and 7B show example masks that may be use with respect to process step 206 of FIG. 5, in which a seed adhesion layer of chrome is first deposited approximately 200 angstroms thick onto the substrates, followed by a PECVD deposition thin film platinum resistor layer approximately 2000 angstroms thick and forming the upper and lower portions of the integrated heater/temperature sensor. The upper and lower portions of the. integrated device, applied to substrates 110A and 110B, may be separated by an air gap approximately 9.6 microns and interconnected by VIAS formed from a metal deposition step that will be described in succeeding step eight. Again, it need be stated that gap thickness is delineated for example purposes and will change depending on the desired application. It should be stated that, depending on the configuration, the platinum thin film resistor may be patterned in various shapes, including but not limited to arched, curved, circular, zigzag, stripped as well as the serpentine pattern of FIGS. 7A and 7B. Given the resistivity of the thin film platinum, approximately 10.6E–8 ohm meters, an example may yield approximately 500 to 2000 ohms resistance at room temperature, depending on the volume of thin film.

Figure 8A:
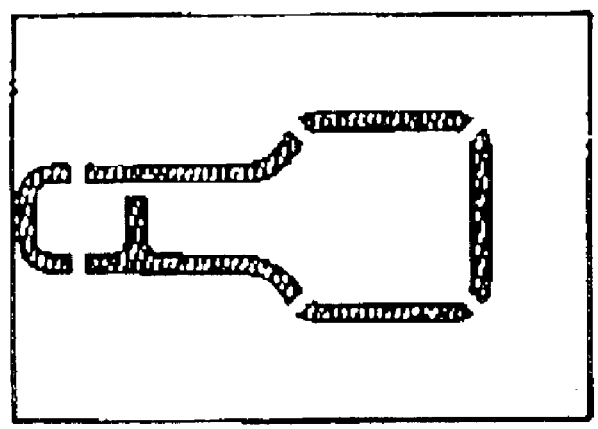
FIGS. 8A and 8B show example spacer element forming masks of the present invention
Figure 8B:
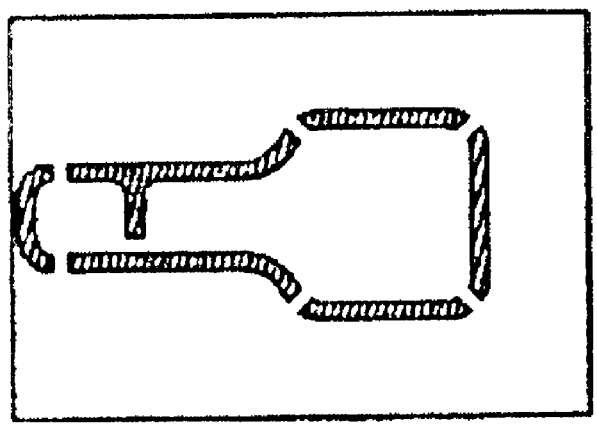

Step seven involves creating the spacer element 107. Spacer element 107 controls the gap thickness of the liquid crystal cell. While it is not necessary to equally distribute the spacer element equally on each substrate, it is preferred that one half of the desire gap thickness of the completed cell shall define the thickness of the spacer element 107 as deposited on each substrate. The combined cell 100 gap thickness may therefore be formed with a tolerance based on deposition process. Silicon dioxide is the preferred material for creating the spacer element, however other materials such as aluminum oxide, silicon nitride, silicon monoxide and other materials compatible with thin film deposition processes that do not substantially compress may also be used as an alternative to the silicon dioxide provided they are compatible with the selected liquid crystal substrate material. FIGS. 8A and 8B show an example mask that may be used to perform the process step 207 of FIG. 5, where a patterned layer of 5 microns thick of silicon dioxide is deposited onto each substrate.

Figure 9A:
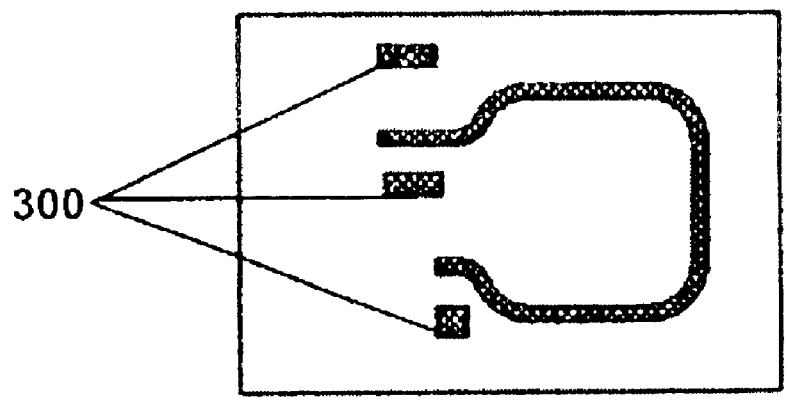
FIG. 9A and 9B show example masks for defining a metal gasket element layer of the present invention.
Figure 9B:
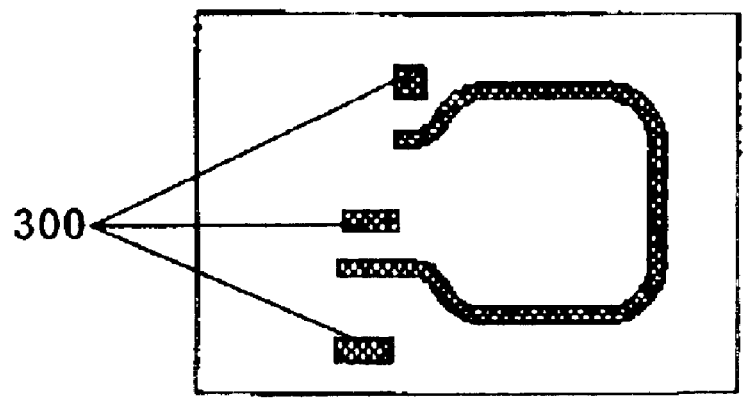

Step eight involves creating the metal gasket element 106. Metal gasket element 108 may be made from a variety of metals, including but not limited to, indium, gold, nickel, tin, chromium, platinum, tungsten, silver, bismuth, germanium and lead. However it is preferable to use indium because of its pliability and relatively low melting temperature. FIGS. 9A and 9B show example masks that may be used to perform process step 208 of FIG. 5, where, for the continuing example purpose, a layer approximately 7 to 9 microns thick of indium may equally be deposited on each substrate. It is generally preferable that metal gasket layer of this process step is deposited thicker than the spacer element of the previous step due to seepage that occurs during the additional processing steps. Metal gasket masks, such as those shown in FIGS. 9A and 9B, may be configured to form referential VIAS 300 that enable electrical interconnection between features deposited on either substrate 110A or 110B. VIAS 300 may also be formed to simplify routing external contact pads to the temperature sensor and heating element. For example the VIAS 300 of the present example are positioned to overlap the heater/temperature sensor platinum layer defined in step six. They are also positioned to overlap the ITO layer so as to define contact pads to drive the two electrodes of the liquid crystal cell.

Step 9 involves aligning and pressing wafers 110A together with 110B. It is known that visual alignment reference marks may be etched into the underlying wafer, or that a physical feature of the glass sheet such as an edge or alignment hole may be used to perform wafer alignment. However, a high yield method of accurately aligning the relative position of the two glass substrates without the need for expensive high precision alignment equipment is hereby presented, in which complimentary interlocking geometric features deposited on each substrate, mate with each other to prevent relative movement of the glass sheets during the bonding and pressing process. Such interlocking features mitigate any non uniformity in the bonding process and given that the typical gap between two glass sheets of a liquid crystal cell is less than 20 micrometers, thin film deposition or screening processes can be used to create precisely controlled and repeatable geometric features. With respect to process step 209 of FIG. 5, the substrates 110A and 110B may be brought together, aligned under pressure at room temperature to form a chemical bond metal gasket at the gap distance defined by the sandwich spacer elements formed from both substrates.

Step 10 involves dicing of the wafers. Process step 210 of FIG. 5 may be performed using a dicing saw or via etching techniques.

Figure 10A:
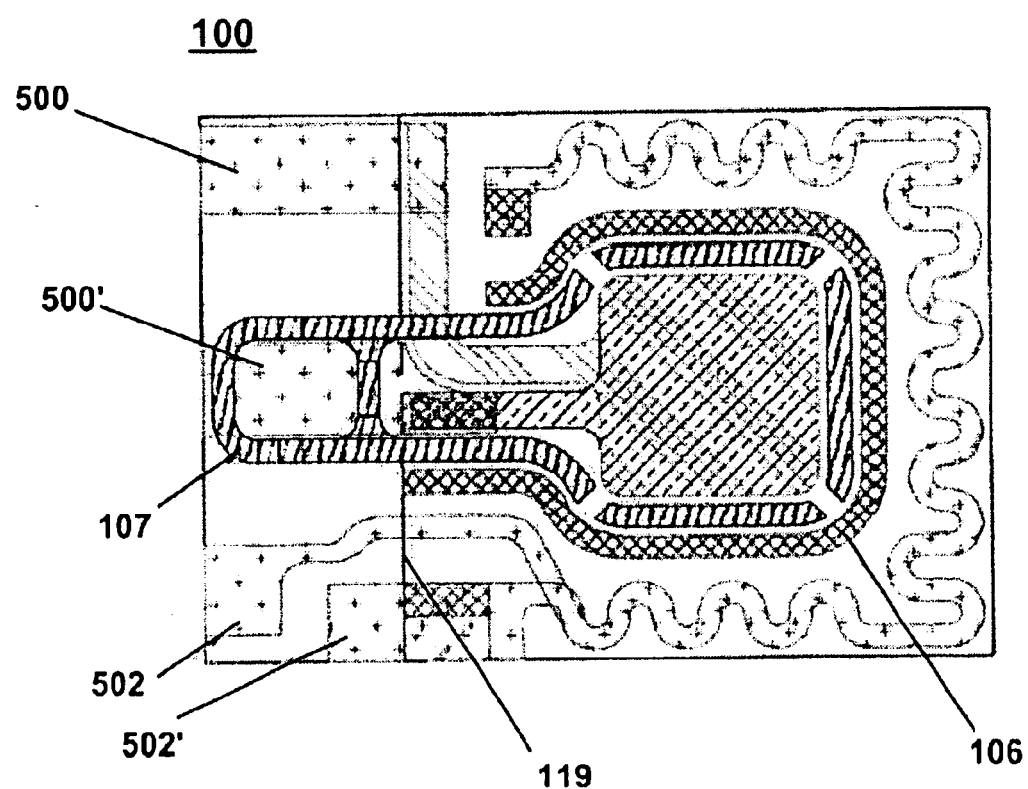
FIG. 10A shows a top view example integrated perspective showing the relationship between various layers of the present invention.

Step 11 involves removal of a portion of protective glass on the liquid crystal cell. FIG. 10A shows a top perspective of the various layers that combine through the substrates when interposed thereupon each other in a fully configured embodiment of the present invention. With respect to process 211 of FIG. 5, the substrate 110B is scored using a diamond dicing saw to cut a trench approximately 90% through the thickness of the substrate and forming the break off line 119 of FIG. 10A. A portion of the substrate 110B is broken off along the break off line 119 to define an access surface 113 of FIG. 10B that provides access to the underlying liquid crystal electrode contact pads 500 and 500', the underlying liquid crystal heater/temperature sensor element electrical contact pads 502 and 502', as well as to the liquid crystal fill port 115.

Step 12 involves filling the liquid crystal device with a liquid crystal molecules, process 212 of FIG. 5. This step may be performed using traditional methods of filling a liquid crystal cell, whereby the cell is placed in a vacuum, a droplet size of liquid crystal material is placed at the fill port 115, and with the release of the vacuum, equilibrium pressure forces the liquid crystal material into the fill port 115 and the fill port is plugged. Several techniques to cap the fill port, including UV curable epoxy which may be used to close the fill port.

Electronic Control System

Figure 11:
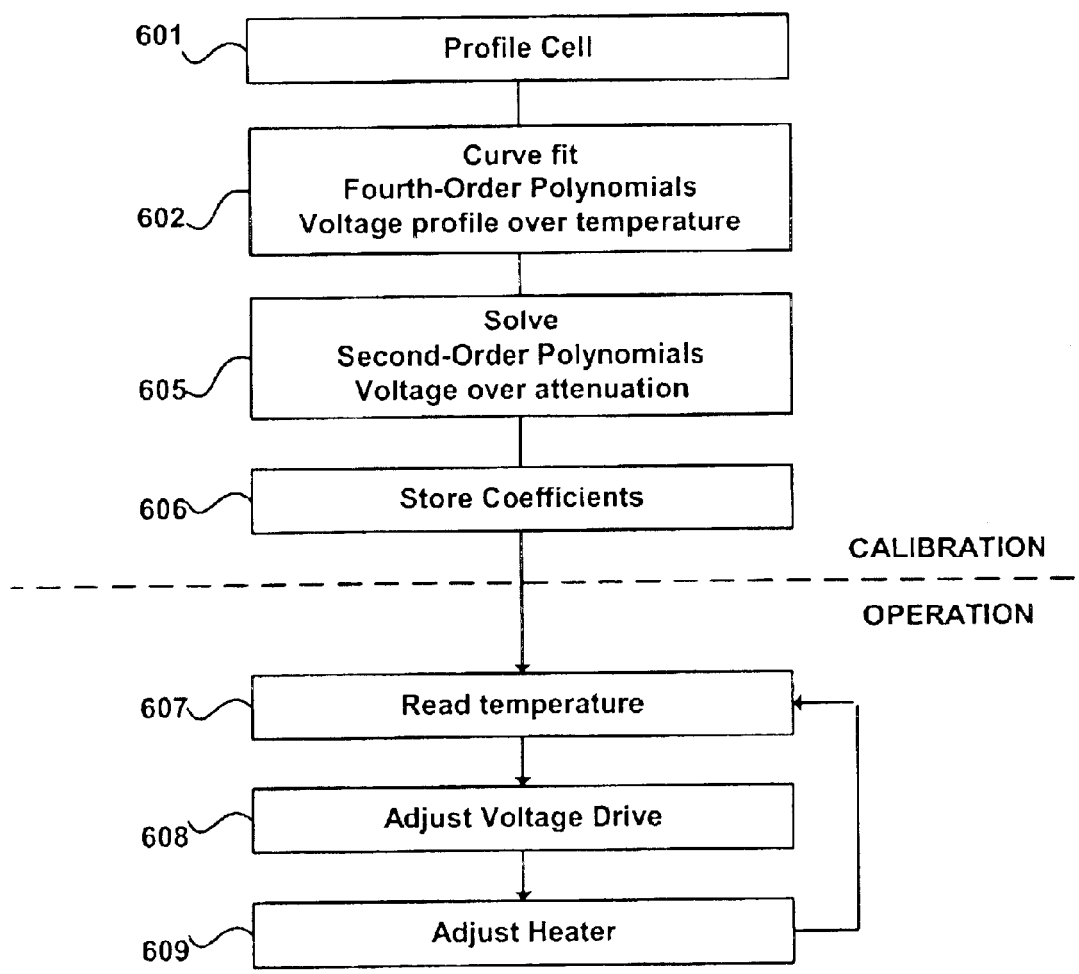
FIG. 11 shows the liquid crystal attenuator thermal calibration and feedback loop method flows.

A block diagram of components directed to a liquid crystal cell system and its host controller are included in FIG. 11 along with the liquid crystal thermal management and voltage controller subsystems of the present invention, now described in further detail.

In one example configuration, host computer 400 may be configured to communicate with microcontroller 402 over a full duplex data interface and enabling the host computer to engage functions, send commands and retrieve data from microcontroller 402. Microcontroller may be configured to store software control routines. The software control routines may function to adjust voltage drive provided to the liquid crystal cell in response to temperature fluctuations.

The microcontroller may utilize a time division multiplexing scheme that multiplexes temperature sensing and heating functions in the integrated sensor/heater device such that the cell may generally be kept at a constant temperature. A calibration process characterizes the profile of the cell and generates a polynomial regression formula that provides the optimal voltage drive output for given temperature and cell state inputs. The microcontroller 402 stores the state of the liquid crystal cell, the regression formula, and reads the temperature of the liquid crystal cell to compute and assert the temperature compensated voltage drive.

FIG. 11 shows a calibration process that may be used to perform the method of the present invention in which a liquid crystal cell thermal operating characteristic profile is translated into deterministic coefficients assembled into a stored regression formula used to adjust the voltage drive to the cell in response to temperature and cell state.

The first step to determine the coefficient values in the cell's temperature and voltage compensation profile, is to profile the liquid crystal cell drive characteristics across a range of temperatures. The profile process step 601 may examine a light source passing through the cell and its attenuation at a given voltage and temperature combination. An operational liquid crystal cell is placed in a thermal chamber programmed to change operating temperature across the desired temperature range at a given interval. At every temperature change interval, a range of voltages are provided to the liquid crystal cell while a performance characteristic, such as attenuation, is measured. Voltage is scanned until reference attenuation levels are achieved, at which point the voltage, attenuation and temperature levels are stored as a grid reference in a cell profile definition table. The performance of the liquid crystal cell is recorded at grid point attenuation and temperature levels, resulting in a multi dimensional lookup table whereby any temperature and voltage input provides an attenuation level output. This table may be represented as a three dimensional surface.

Step two requires processing the lookup table to smooth the voltage profile over temperature at the given attenuation levels as recorded in the previous step. A statistical program capable of performing regression analysis, such as Mathematica® may be used to perform this process step 602. The regression software is provided with the look up table generated in step one, and performs a fourth order regression curve fitting process that generates for each attenuation level, the appropriate coefficients a,b,c,d, and e representing a voltage versus temperature profile of the cell at each attenuation level, represented by the following formula, $$v = a + bT + cT^2 + dT^3 + eT^4$$

$$v_1 = a_1 + b_1T + c_1T^2 + d_1T^3 + e_1T^4$$

$$v_2 = a_2 + b_2T + c_2T^2 + d_2T^3 + e_2T^4$$

...

$$v_n = a_n + b_nT + c_nT^2 + d_nT^3 + e_nT^4$$

where V=voltage, T=liquid crystal cell temperature, a,b,c,d,e=curve fit coefficients, and n=attenuation level.

Given that smooth curves result from the prior step that define the optimal voltage drive level for a given temperature at the recorded grid attenuation level, step three results in smooth curve regressions fit across orthogonal axis of the three dimensional surface, whereby the smooth curves are fit over the coarse attenuation grid recorded in step 1. In this process step 603, the five coefficients of the previous step are each solved by a second order regression. Specifically, Mathematica® or any suitable program is used to solve for the three coefficients that fit the profile of each of the five coefficients a,b,c,d and e across all of the orders of the regression $v_n a_n + b_n T + c_n T^2 + d_n T^3 + e_n T^4$. So, a smooth surface profile defines the optimum voltage compensation level given an input attenuation state and temperature by the following formula $$v = a + bT + cT^2 + dT^3 + eT^4,$$

where, $$a = (X + Y\theta + Z\theta^2)$$

$$b = (X_1 + Y_1\theta + Z_1\theta^2)$$

$$c = (X_2 + Y_2\theta + Z_2\theta^2)$$

$$d = (X_3 + Y_3\theta + Z_3\theta^2)$$

$$e = (X_4 + Y_4\theta + Z_4\theta^2)$$

Theta=liquid crystal attenuation level
X,Y,Z=solution to zero order coefficient
$X_1, Y_1, Z_1$=solutions to first order coefficient
$X_2, Y_2, Z_2$=solutions to second order coefficient
$X_3, Y_3, Z_3$=solutions to third order coefficient
$X_4, Y_4, Z_4$=solutions to fourth order coefficient The fifteen coefficient solutions (Xn,Yn,Zn) where n=0 to 4, may be generated by Mathematica, using the Fit(data, (1,x,x^2, ... ,x^n),x) function or other suitable software packages capable of performing curve fitting regression.

Step four is the final step in the calibration process of FIG. 11, process 606, and results in storing the coefficients in the liquid crystal control system which is now described.

Figure 12:
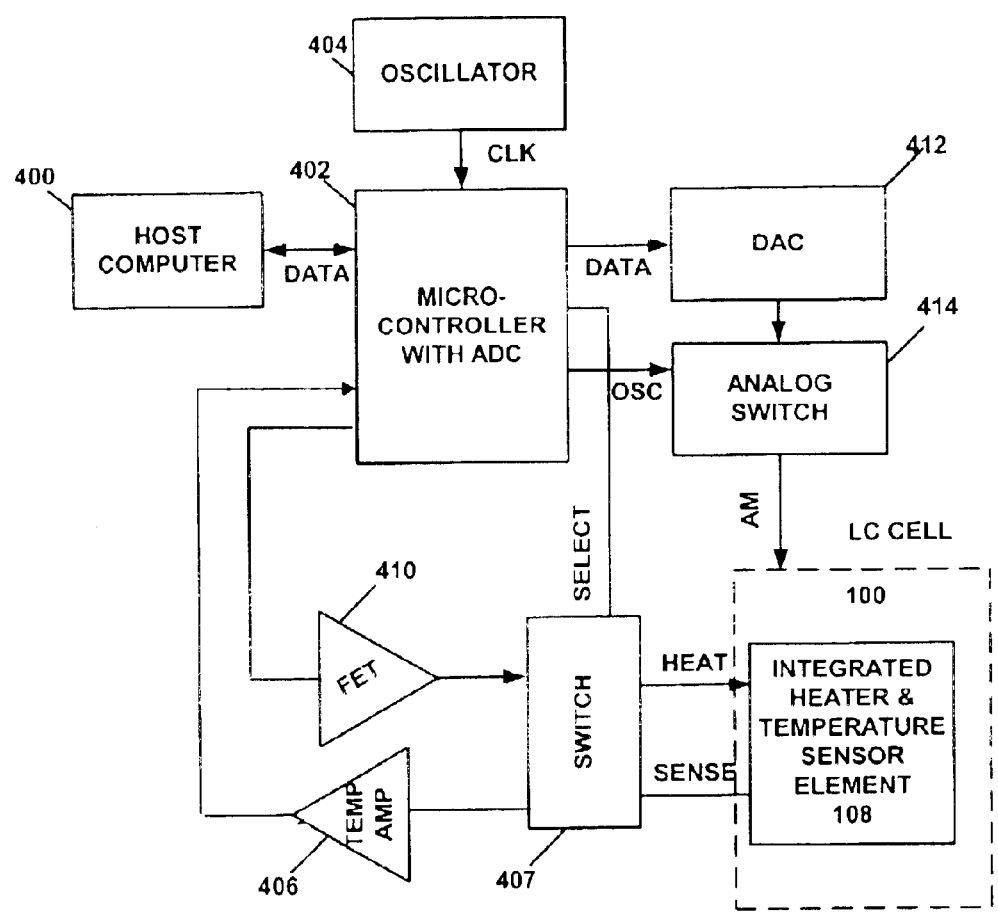
FIG. 12 shows a block system diagram for the electronic control and thermal management system of the present invention.

The coefficients that profile the liquid crystal characteristics may be stored in microcontroller 402 memory (FIG. 12) by flashing the memory of the microcontroller with the appropriate 15 coefficient values.

The thermal compensation system of the present invention operates by reading the temperature of the liquid crystal cell and adjusting the voltage drive of the cell based on the cell state. The cell state may typically be OFF, ON or operate in a variable mode. The cell state may be stored in the microcontroller 402 and also be configured via the host computer 400.

Figure 10B:
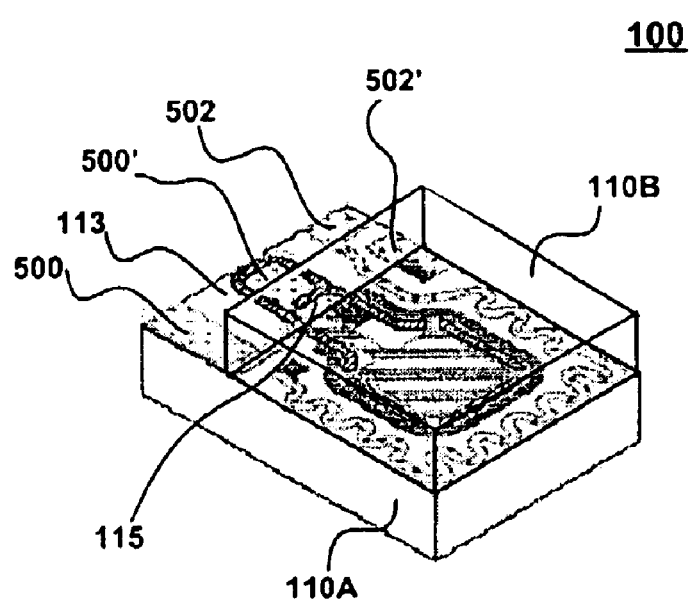
FIG. 10B is an isometric view showing an example liquid crystal attenuator at the termination of the fabrication process.

Microcontroller may be a PIC microchip having an internal analog digital converter and operating with a 10 Mhz crystal oscillator 404 clock. The microcontroller may be connected to a digital analog converter (DAC) configured to provide an output voltage level in response to a configuration pulse stream from the microcontroller over a serial interface. The output of the DAC connects to the input of an analog switch 414 which is clocked by a port pin of the microcontroller at approximately 1.2 khz. DATA passed to the DAC defines the amplitude of an AM transmission over a 1.2 khz carrier that produces a differential voltage drive to the liquid crystal cell electrodes 500 and 500' (FIG. 10B).

A temperature sensor reading may be provided by the internal integrated heater/temperature sensor from an external device. One of the heater/temperature sensor electrodes 502 or 502' of the liquid crystal cell 100 may be grounded while the other may connect to switch 407. Switch 407 may selectively engage the integrated heater/temperature sensor element 108 in a sense or heat mode. More specifically, switch 407 may be configured ON to connect the ungrounded heater/temperature electrode through instrumentation amplifier 406 to an ADC coupled to the microcontroller which reads the temperature on the liquid crystal cell, or it may be configured OFF so that power amplifier FET 410, which may be controlled by a pulse train from microcontroller 402 and applies a voltage potential to operate the device 108 as a heater.

In a temperature sense feedback closed loop operation, which shall hereby be referred to as the loop embraced by process steps 607 through 609 of FIG. 11, the microcontroller reads the temperature of the liquid crystal cell and calculates the voltage drive based on the sensed temperature, T, and the current state of the liquid crystal cell, Theta. The fifteen coefficients are plugged back into the fourth order regression formula to establish a smooth surface profile delineating an optimal voltage to supply to liquid crystal cell for a given temperature and cell attenuation level:

$$v = (X + Y\theta + Z\theta^2) + (X_1 + Y_{1\theta} + Z_1\theta^2)T^2 + (X_2 + Y_2\theta + Z_2\theta^2)T^2 + (X_3 + Y_3\theta + Z_3\theta^2)T^3 + (X_4 + Y_4\theta + Z_4\theta^2)T^4$$

The new voltage value V is computed and transmitted to the DAC 412 which supplies the appropriate amplitude DC voltage into the clocked analog switch 414 to produce the temperature compensated AM voltage drive to the liquid crystal cell.

The liquid crystal cell may also be maintained about a reference temperature. Process step 609 with respect to FIG. 11 involves the application of heat to maintain the temperature of the liquid crystal cell about a reference temperature. The reference temperature may be above the ambient room temperature or above the temperature of any carrier device that may be coupled to the LC cell. The selection of a reference temperature above the ambient temperature will result in the tendency of the LC cell to cool to meet the ambient temperature after the application of a heat burst. A counter thermal bias is therefore generated to support temperature stability about the reference temperature.

Microcontroller memory may store the reference temperature, the value of the current temperature, historical temperatures, and, historical levels of heat applied to the LC cell. The value of the sensed temperature T at every instance may be compared against the reference temperature to determine the amount of heat to apply to the liquid crystal cell. An 8 bit analog digital converter will provide approximately ⅓ of a degree of temperature sensing resolution over the desired temperature range, so the example system may provide for temperature stability about a reference temperature to within ⅓ degree Celsius. At every instance of process step 609, a threshold detector routine stored in microcontroller ROM may trigger a control function if the sensed temperature of the liquid crystal cell falls below the desired operating reference temperature. The control function may determine how much heat to apply to the liquid crystal cell. The control function may utilize error minimizing routines that track the change in temperature across multiple instances of process step 609. The error correcting routines may store the previous temperature reading T0 along with the previous amount of heat applied to the liquid crystal cell H0. The temperature reading and every succeeding temperature reading T1 may be compared against T0 to determine the amount of temperature change resulting from the previous heating of the liquid crystal cell. Heat may be applied to the liquid crystal cell by way of the FET power driver as described above. The heater may be triggered at a fixed or variable duty cycle and controlled using frequency or amplitude modulation.

Although the present invention has been fully described by way of description and accompanying drawings, it is to be noted that various changes and modifications will be apparent to those skilled in the art. For example, various patterns may be used to form the spacer element, metal gasket and integrated heater/temperature sensor elements of the basic cell platform. Use of external temperature sensors and heaters in part or whole may be applied using the temperature compensation methods and regression of the present invention. The metal gasket may be modulated to provide heating function in addition to its function as a moisture barrier support membrane. Epoxy gaskets may be used in combination with metal gasket elements in part or whole, and the metal gasket elements may comprise a single solder cap. Anchoring and aligning the liquid crystal material in a cell may also be performed using photo alignment material, Staralign by Vantio of Switzerland or or other known alignment methods, including laser etching. Anchoring the liquid crystal material in the cell (described hereunder as step five) may be performmed before patterning of the polyimide (described hereunder as step four). The process steps for the closed loop temperature feedback may also be rearranged such that the heating process is performed prior to applying the voltage drive. The order of fitting voltage with each dimension of the three dimensional surface is reversable and other three dimensional surface fitting algorithms may be used, including but not limited to those that describe a surface with one dimension fitting a fourth degree polynomial and the other dimension fitting a second degree polynomial.

Amplitude or frequency modulation may be used to drive the liquid crystal cell. The fourth embodiment of this invention may be configured with the integrated temperature sensor/heating element of the third embodiment of the present invention. The liquid crystal cell may not be limited to a single pixel. The liquid crystal cell may be comprised of multiple pixels. Arrays of liquid crystal cells may be formed, including arrays of cells having one or more pixels. Therefore, it is to be noted that various changes and modifications from those abstractions defined herein, unless otherwise stated or departing from the scope of the present invention, should be construed as being included therein and captured hereunder with respect to the claims.

What is claimed is:

1. A variable optical attenuator, comprising:
    a first substrate having a top surface etched with a subwavelength grating polarizer and a bottom surface having electrode and alignment layers,
    a second substrate having a bottom surface etched with a second sub wavelength optical grating polarizer and a top surface having a second electrode and alignment layers, said second polarizer having an optical axis orthogonal to the polarizer on the first substrate, said top surface of second substrate placed in opposition to the bottom surface of first substrate,
    liquid crystals coupled between the first and second substrates,
    wherein an optical signal polarized with the same optical axis as the second polarizer is rotated as it passes through the liquid crystal and may be variably attenuated by the second polarizer with the application of voltage across the electrode layers.

2. The variable optical attuenator of claim 1, further including a spacer layer coupled between the first and second substrates and a metal gasket layer bonded to the first and second substrates.

3. The variable optical attuenator of claim 2, further including an active thermal element disposed between the first and second substrates.

4. The variable optical attuenator claim 2, wherein the spacer layer contains one or more materials selected from the group consisting of silicon dioxide, aluminum oxide, silicon nitride, silicon monoxide.

5. The variable optical attuenator of claim 2, wherein the metal gasket layer includes one or more materials selected from the group consisting of indium, gold, nickel, tin, chromium, platinum, tungsten, silver, bismuth, germanium and lead.

6. The variable optical attuenator of claim 2, wherein both substrates are glass.

7. The variable optical attenuator of claim 2, wherein the spacer layer and metal gasket layer are deposited thin film.

8. The variable optical attenuator of claim 3, wherein the active thermal element is deposited onto the first and second substrates.

9. The variable optical attenuator of claim 3, wherein the active thermal element is disposed substantially around the perimeter of the liquid crystal cell.

10. The variable optical attenuator of claim 3, wherein the active thermal element is arranged in a serpentine pattern.

11. The variable optical attenuator of claim 3, wherein the active thermal element provides heating and temperature sensing capability.

12. The variable optical attenuator of claim 3, wherein the active thermal element is comprised of chrome-platinum.

13. The variable optical attenuator of claim 3, further including at least one VIA formed between the metal spacer layer and first or second electrodes.

14. The variable optical attenuator of claim 3, further including at least one VIA formed between the active thermal element and the metal spacer layer.

15. The variable optical attenuator of claim 3, wherein the active thermal element has electrodes that provide a resistance value used to determine temperature of the variable optical attenuator.

16. The variable optical attenuator of claim 15, further including a microcontroller and switch coupled to the active thermal element such that the state of the switch controls routes resistance values from the active thermal element to the microcontroller and voltage signals from the microcontroller to the active thermal element.

17. The variable optical attenuator of claim 16, wherein a VIA formed by a layer of metal gasket material connects the thermal element across the first and second substrates.

18. A variable optical attenuator, comprising:
    a first substrate having a top surface etched with a subwavelength grating polarizer and a bottom surface having a first electrode layer and a first alignment layer,
    a second substrate comprising a top surface having a second electrode layer, and a second alignment layer anchored in an orthogonal orientation to the first alignment layer, said second substrate placed in opposition to the bottom surface of first substrate,
    liquid crystals coupled between the first and second substrates, a spacer layer coupled between the first and second substrates, a metal gasket layer bonded to the first and second substrates, wherein an optical signal transmitted through the second substrate may have its polarization rotated as it passes throught the liquid crystals and variably atteneated at the polarizer on the first substrate with the application of voltage.

19. A variable optical attenuator, comprising:

a first substrate made from material suitable to enable the substrate to perform as a Faraday rotator, said first substrate having top and bottom surfaces etched with a subwavelength grating polarizers whereby the top surface polarizer is 45 degrees offset from the bottom polarizer to enable the substrate to perform as an isolator, said first substrate further comprising on the bottom surface a first electrode layer, and a first alignment layer, a second substrate comprising a top surface having a second electrode layer, and a second alignment layer that is anchored in an orthogonal orientation to the first alignment layer, said second substrate placed in opposition to the bottom surface of first substrate, liquid crystals coupled between the first and second substrates, wherein an optical signal transmitted through the second substrate may have its polarization rotated as it passes through the liquid crystals, variably attenuated by the bottom polarizer on the first substrate with the application of voltage on the electrode layers, and isolated by the isolator formed from the first substrate.

20. The variable optical attuenator of claim 19, further including a spacer layer coupled between the first and second substrates and a metal gasket layer bonded to the first and second substrates.

21. The variable optical attuenator of claim 20, further including an active thermal element disposed between the first and second substrates.

22. The variable optical attuenator claim 20, wherein the spacer layer contains one or more materials selected from the group consisting of silicon dioxide, aluminum oxide, silicon nitride, silicon monoxide.

23. The variable optical attuenator of claim 20, wherein the metal gasket layer includes one or more materials selected from the group consisting of indium, gold, nickel, tin, chromium, platinum, tungsten, silver, bismuth, germanium and lead.

24. The variable optical attuenator of claim 20, wherein both substrates are glass.

25. The variable optical attunator of claim 20, wherein the spacer layer and metal gasket layer are deposited thin film.

26. The variable optical attenuator of claim 21, wherein the active thermal element is deposited onto the first and second substrates.

27. The variable optical attunator of claim 21, wherein the active thermal element is disposed substantially around the perimeter of the liquid crystal cell.

28. The variable optical attunator of claim 21, wherein the active thermal element is arranged in a serpentine pattern.

29. The variable optical attunator of claim 21, wherein the active thermal element provides heating and temperature sensing capability.

30. The variable optical attunator of claim 21, wherein the active thermal element is comprised of chrome-platinum.

31. The variable optical attunator of claim 21, further including at least one VIA formed between the metal spacer layer and first or second electrodes.

32. The variable optical attunator of claim 21, further including at least one VIA formed between the active thermal element and the metal spacer layer.

33. The variable optical attenuator of claim 21, wherein the active thermal element has electrodes that provide a resistance value used to determine temperature of the variable optical attunator.

34. The variable optical attenuator of claim 33, further including a microcontroller and switch coupled to the active thermal element such that the state of the switch controls routes resistance values from the active thermal element to the microcontroller and voltage signals from the microcontroller to the active thermal element.

35. The variable optical attenuator of claim 34, wherein a VIA formed by a layer of metal gasket material connects the thermal element across the first and second substrates.

36. A variable optical attenuator, comprising:

a first substrate etched with a subwavelength grating polarizer and having a first electrode layer, and a first alignment layer, a second substrate made from material suitable to enable the substrate to perform as a Faraday rotator, said second substrate having top and bottom surfaces both etched with subwavelength grating polarizers whereby the top surface polarizer is 45 degrees offset from the bottom surface polarizer to enable the substrate to perform as an isolator, said second substrate further comprising on the top surface a second electrode layer, and a second alignment layer, said second aligment layer achnored in a substantially orthogonal orientation to the first alignment layer on the first substrate, said top surface of the second substrate placed in opposition to the bottom surface of first substrate, liquid crystals coupled between the first and second substrates, wherein an optical signal transmitted through the second substrate may be isolated by the second substrate, rotated as it passes through the liquid crystals, variably attenuated by the polarizer on the first substrate with the application of voltage on the electrode layers.

37. The variable optical attuenator of claim 36, further including a spacer layer coupled between the first and second substrates and a metal gasket layer bonded to the first and second substrates.

38. The variable optical attuenator of claim 37, further including an active thermal element disposed between the first and second substrates.

39. The variable optical attuenator claim 37, wherein the spacer layer contains one or more materials selected from the group consisting of silicon dioxide, aluminum oxide, silicon nitride, silicon monoxide.

40. The variable optical attuenator of claim 37, wherein the metal gasket layer includes one or more materials selected from the group consisting of indium, gold, nickel, tin, chromium, platinum, tungsten, silver, bismuth, germanium and lead.

41. The variable optical attuenator of claim 37, wherein both substrates are glass.

42. The variable optical attunator of claim 37, wherein the spacer layer and metal gasket layer are deposited thin film.

43. The variable optical attenuator of claim 38, wherein the active thermal element is deposited onto the first and second substrates.

44. The variable optical attunator of claim 38, wherein the active thermal element is disposed substantially around the perimeter of the liquid crystal cell.

45. The variable optical attunator of claim 38, wherein the active thermal element is arranged in a serpentine pattern.

46. The variable optical attunator of claim 38, wherein the active thermal element provides heating and temperature sensing capability.

47. The variable optical attunator of claim 38, wherein the active thermal element is comprised of chrome-platinum.

48. The variable optical attunator of claim 38, further including at least one VIA formed between the metal spacer layer and first or second electrodes.

49. The variable optical attunator of claim 38, further including at least one VIA formed between the active thermal element and the metal spacer layer.

50. The variable optical attenuator of claim 38, wherein the active thermal element has electrodes that provide a resistance value used to determine temperature of the variable optical attunator.

51. The variable optical attenuator of claim 50, further including a microcontroller and switch coupled to the active thermal element such that the state of the switch controls routes resistance values from the active thermal element to the microcontroller and voltage signals from the microcontroller to the active thermal element.

52. The variable optical attenuator of claim 51, wherein a VIA formed by a layer of metal gasket material connects the thermal element across the first and second substrates.

* * * * *